United States Patent
Marks et al.

(10) Patent No.: US 9,418,434 B2
(45) Date of Patent: Aug. 16, 2016

(54) METHOD FOR DETECTING 3D GEOMETRIC BOUNDARIES IN IMAGES OF SCENES SUBJECT TO VARYING LIGHTING

(71) Applicant: Mitsubishi Electric Research Laboratories, Inc., Cambridge, MA (US)

(72) Inventors: Tim K Marks, Newton, MA (US); Oncel Tuzel, Winchester, MA (US); Fatih Porikli, Watertown, MA (US); Jay Thornton, Watertown, MA (US); Jie Ni, Hyattsville, MD (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 345 days.

(21) Appl. No.: 13/855,808

(22) Filed: Apr. 3, 2013

(65) Prior Publication Data

US 2014/0300600 A1    Oct. 9, 2014

(51) Int. Cl.
  *G06T 15/50*  (2011.01)
  *G06T 7/00*  (2006.01)
  *G06K 9/46*  (2006.01)

(52) U.S. Cl.
  CPC ............ *G06T 7/0073* (2013.01); *G06K 9/4661* (2013.01)

(58) Field of Classification Search
  CPC ...................................................... G06T 15/50
  USPC ......................................................... 345/426
  See application file for complete search history.

(56) References Cited

U.S. PATENT DOCUMENTS

| 7,206,449 | B2 | 4/2007 | Raskar |
| 7,295,720 | B2 | 11/2007 | Raskar |
| 7,738,725 | B2 | 6/2010 | Raskar |
| 7,756,356 | B2 * | 7/2010 | Pfister et al. .................. 382/276 |
| 2004/0263510 | A1 * | 12/2004 | Marschner et al. ........... 345/419 |
| 2005/0128196 | A1 * | 6/2005 | Popescu et al. ............... 345/420 |
| 2009/0097039 | A1 * | 4/2009 | Kawasaki et al. ............. 356/603 |
| 2009/0226049 | A1 * | 9/2009 | Debevec et al. .............. 382/118 |

OTHER PUBLICATIONS

Shnayderman, A., A. Gusev, and A.M. Eskicioglu. 'An SVD-Based Grayscale Image Quality Measure for Local and Global Assessment'. IEEE Trans. on Image Process. 15.2 (2006): 422-429.*
H. Ackermann and K. Kanatani, "Robust and efficient 3D reconstruction by self-calibration", Proc. IAPR Conf. on Machine Vision Applications, Tokyo, 178-181 (2007).*
Weiss et al., "Deriving intrinsic images from image sequences," ICCV 2001. vol. 2, pp. 68-75 vol. 2.

(Continued)

*Primary Examiner* — Ming Hon
*Assistant Examiner* — Shivang Patel
(74) *Attorney, Agent, or Firm* — Gene Vinokur; James McAleenan; Hironori Tsukamoto

(57) ABSTRACT

Three-dimensional (3D) geometric boundaries are detected in images of a scene that undergoes varying lighting conditions caused by light sources in different positions, from a set of input images of the scene illuminated by at least two different lighting conditions. The images are aligned, e.g., acquired by a stationary camera, so that pixels at the same location in all of the input images correspond to the same point in the scene. For each location, a patch of corresponding pixels centered at the location is extracted from each input image. For each location, a confidence value that there is a 3D geometric boundary at the location is determined.

16 Claims, 8 Drawing Sheets

Light 1 Light 2 Light 3 Light 4 Light 5

(56) References Cited

OTHER PUBLICATIONS

Koppal et al., Narasimhan. Appearance derivatives for isonormal clustering of scenes. IEEE TPAMI, 31(8):1375-1385, 2009.

S. Boyd, N. Parikh, E. Chu, B. Peleato, and J. Eckstein. Distributed optimization and statistical learning via the alternating direction method of multipliers. Found. Trends Mach. Learn., 3(1):1-122, 2011.

* cited by examiner

Semi-Binary Nonnegative Matrix Factorization

1: Input: A set of images $\mathbf{Y} \in \mathbb{R}^{+n \times m}$
2: Compute the number of lights $l = \text{rank}(\mathbf{Y})$
3: Initialize $\mathbf{X}^0 = \text{zeros}(n, m)$, $\mathbf{V}^0 = \text{zeros}(n, l)$,
   $\mathbf{W}^0 = \text{rand}(l, m)$, $\mathbf{U}^0 = \text{zeros}(n, m)$, $\mu = 10^{-3}$, $k = 0$
4: while Not converged do
5:    Update primal variables $\mathbf{X}^{k+1}$, $\mathbf{V}^{k+1}$, $\mathbf{W}^{k+1}$ according to (7) and (8)
6:    Update dual variable $\mathbf{U}^{k+1}$ according to (9)
7: end while
8: Round each entry of the indicator matrix $\mathbf{W}$ to binary
9: Solve for final light basis images $\mathbf{V}$ using (10)
10: Output: Basis images $\mathbf{V}$ and binary light indicator matrix $\mathbf{W}$

Fig. 4

Detect geometric boundary from images under variable lighting

1: Input: A set of $m$ images $\mathbf{Y}$
2: At each pixel location, extract patches $\{\mathbf{P}_j\}_{j=1}^m$ from $\mathbf{Y}$, form matrix $\mathbf{Z}$ as in (14).
3: Compute confidence map $C$ by using (15) to get per-pixel confidence values.

Fig. 6

Detect geometric boundary from images under variable lighting

1: Input: A set of $m$ images $\mathbf{Y}$, lighting basis images $\{\mathbf{v}_i\}_{i=1}^{l}$
2: for $i=1,2,\ldots,l$ do
3:    Get image set $\mathbf{Y}^{(i)}$ using equation (16)
4:    At each pixel location, extract patches $\{\mathbf{P}_j\}_{j=1}^{m}$ from $\mathbf{Y}^{(i)}$, form matrix $\mathbf{Z}$ as in (14). Compute confidence map $C^{(i)}$ using (15) to get per-pixel confidence values.
5: end for
6: Output the final confidence map $C$ by taking the minimum at each pixel among $\{C^{(i)}\}_{i=1}^{l}$

Fig. 7

METHOD FOR DETECTING 3D GEOMETRIC BOUNDARIES IN IMAGES OF SCENES SUBJECT TO VARYING LIGHTING

RELATED APPLICATION

This U.S. Patent Application is related to U.S. patent application Ser. No. 13/855,800 cofiled herewith and incorporated by reference.

FIELD OF THE INVENTION

This invention relates generally to computer vision, and more particularly to detecting boundaries in images of a scene subject to lighting variations.

BACKGROUND IF THE INVENTION

Edge detection is a fundamental problem in computer vision. Edge detection provides important low level features for many applications. Edges in images of a scene can result from different causes, including depth discontinuities, differences in surface orientation, surface texture, changes in material properties, and varying lighting.

Many methods model edges as changes in low-level image properties, such as brightness, color, and texture, within an individual image. Yet, the issue of indentifying image pixels that correspond to 3D geometric boundaries, which are discrete changes in surface depth or orientation, has received less attention.

Raskar, in U.S. Pat. No. 7,295,720 B2, detects depth edges by applying a shadow-based technique using a multi-flash camera. That method applies only to depth discontinuities, not changes in surface normal, and requires a controlled set of lights that encircles the lens of a camera.

3D geometric boundaries accurately represent characteristics of scenes that can provide useful cues for a variety of tasks including segmentation, scene categorization, 3D reconstruction, and scene layout recovery.

In "Deriving intrinsic images from image sequences," ICCV 2001, Volume: 2, Page(s): 68-75 vol. 2, Weiss et al. describe a sequence of images of a scene that undergoes illumination changes. Each image in the sequence is factorized into a product of a single, constant reflectance image and an image-specific illumination image.

U.S. Pat. No. 7,756,356 describes factoring a time-lapse photographic sequence of an outdoor scene into shadow, illumination, and reflectance components, which can facilitate scene modeling and editing applications. That method assumes a single point light source at infinity (the sun), which is moving smoothly over time, and an ambient lighting component.

In "Appearance derivatives for isonormal clustering of scenes," IEEE TPAMI, 31(8):1375-1385, 2009," Koppal et al. describe image sequences that are acquired by waving a distant light source around a scene. The images are then clustered into regions with similar surface normals. That work also assumes a single distant light source whose position varies smoothly over time and an orthographic camera model.

SUMMARY OF THE INVENTION

Our invention considers a set of images of a static scene (which can be in an indoor or outdoor environment), acquired by a stationary camera under varying illumination conditions. One objective of the invention is to detect 3D geometric boundaries from the set of images.

Another objective of the invention is to factorize these images into a set of basis images. In these applications, the positions of the light sources are unknown, the lights are not necessarily point sources, and distances from the lights (and camera) to the scene cannot be assumed to be infinite, because they are not necessarily much larger (i.e., larger by one or more orders of magnitude) than a size of the scene. This breaks the assumptions of existing methods for recovering 3D structure from 2D images under varying lighting such as photometric stereo, structured light, and isonormal clustering, and of existing methods for factorizing the effects of illumination from a set of images such as factored time-lapse video and intrinsic images.

The embodiments of the invention provide a method for detecting 3D geometric boundaries in a set of images of a static scene, captured with a fixed camera viewpoint, under unknown and varying illumination conditions. In some embodiments, lighting basis images are recovered.

One objective of some embodiments is to identify 3D geometric boundaries in a set of 2D images of a static scene (which can be in an indoor environment) that is subject to unknown and changing illumination. As strictly defined herein, a 3D geometric boundary as observed in images of a scene is a contour that separates two surfaces in the scene where there is a 3D depth discontinuity, or a significant change in surface orientation. These boundaries can be used effectively to understand the 3D layout of the scene. The 3D geometric boundary is different from a 2D edge, such as a texture edge or shadow edge.

To distinguish 3D geometric boundaries from 2D texture edges, some embodiments of the invention analyze the illumination subspace of local appearance at each image location. This is based on the realization that for non-specular, e.g., Lambertian, surfaces, neighboring pixels on the same smooth 3D surface tend to have the same relative response to lighting even though the pixels may have different colors, i.e., albedos or reflection coefficients. The reason is that in a small neighborhood the 3D surface is locally planar, so two points on the surface that correspond to adjacent pixels have approximately the same normal. The distance between these two points is typically much smaller than the distance to any of the light sources and the camera.

Based on this realization, the 3D geometric boundary detection method can distinguish pixels associated with 3D geometric boundaries, i.e., pixels whose immediate neighborhoods in the image include a discontinuity in surface normal or in depth, from pixels whose neighborhoods may contain sharp texture or intensity boundaries but correspond to a single surface.

The method formulates 3D geometric boundary detection as a per-pixel classification problem by analyzing the illumination subspace of local appearance at each pixel location. Specifically, the method uses the dimension of the illumination subspace to indicate the presence of a 3D geometric boundary.

One objective of the invention is to determine a set of lighting basis images from the set of images of a static scene subject to unknown and changing illumination due to combinations of a set of stationary light sources. A lighting basis image is the image that would be formed when the scene is illuminated by one of the individual light sources. The light sources do not need to point light sources. The basis images provide a natural, succinct representation of the scene, with qualitative and quantitative improvement when compared with the prior art, to enable scene editing (such as relighting) and identification and removal of shadow edges.

In some embodiments of the invention, the method for recovery of lighting basis images uses semi-binary nonnegative matrix factorization (SBNMF). SBNMF is related to nonnegative matrix factorization (NMF), which factors a nonnegative data matrix into a product of two nonnegative matrices, and for which many techniques are known.

Unlike NMF, SBNMF factors a nonnegative data matrix into a product of a nonnegative matrix and a binary matrix, where a binary matrix is a matrix in which each element is either 0 or 1. That is the method factors a nonnegative matrix containing the images into a nonnegative matrix of lighting basis images and a binary weight matrix that indicates which light sources are ON or OFF for each image. The recovered set of lighting basis images provide a compact representation of the scene under varying lighting.

In some embodiments, the basis images can be used to in conjunction with the method for 3D geometric boundary detection to distinguish shadow edges from true 3D geometry edges.

BRIEF DESCRIPTION OF THE DRAWINGS

FIG. 4 is a block diagram of pseudocode of the semi-binary nonnegative matrix factorization (SBNMF);

FIG. 6 is a block diagram of pseudocode of a geometric boundary dection method according to some embodiments of the invention; and FIG. 7 is a block diagram of pseudocode of a geometric boundary dection method in which shadow edges are removed, according to some embodiments of the invention.

DETAILED DESCRIPTION OF THE PREFERRED EMBODIMENTS

Figure 1:
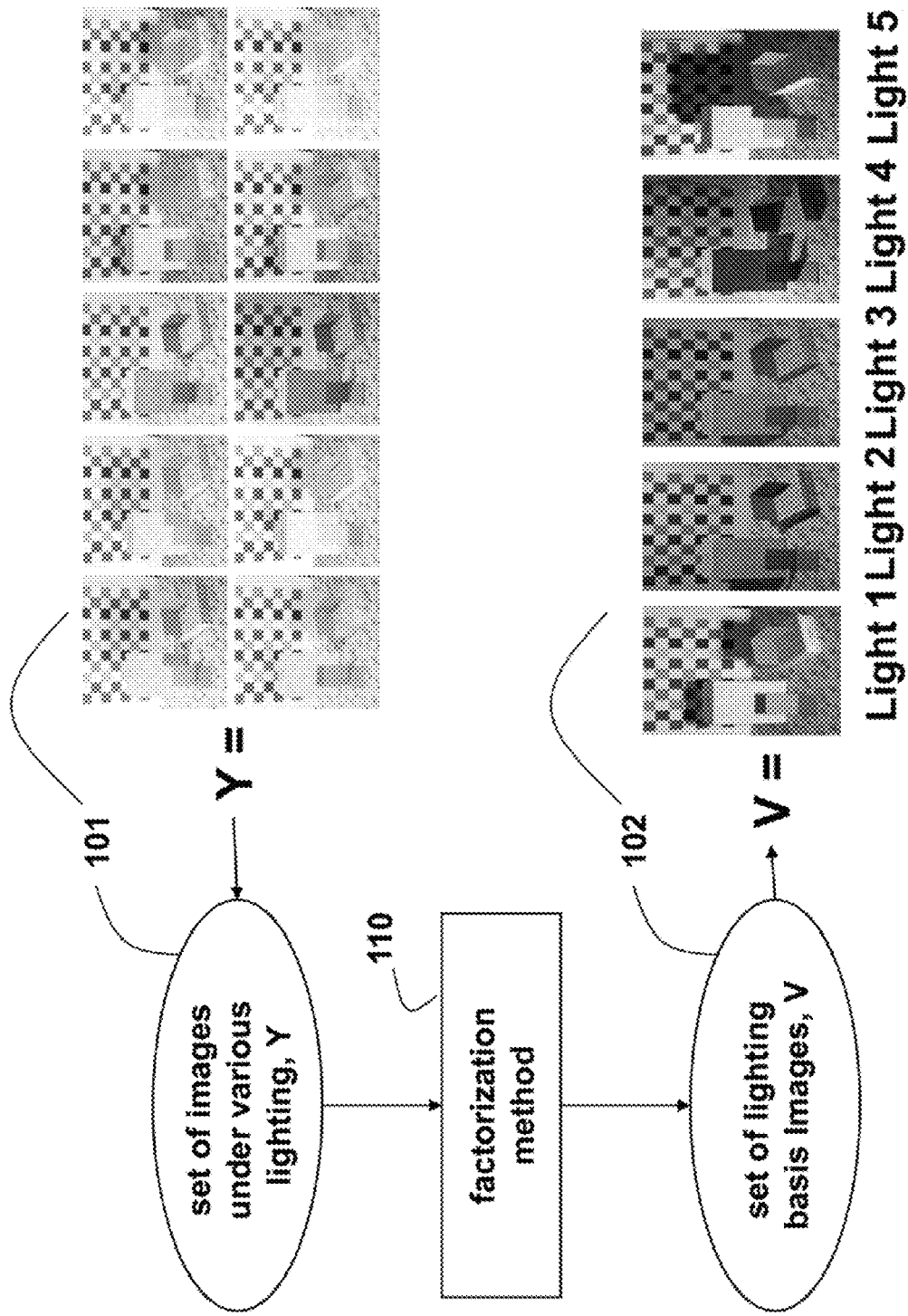
FIG. 1 is a schematic of a method for factorizing a set of images into a set of lighting basis images according to some embodiments of the invention.

As shown in FIG. 1, some embodiments of the invention provide a method for factorizing 110 a set of images Y 101 acquired of a scene subject to varying lighting conditions into a set of lighting basis images V 102. The scene is lit by multiple light sources, each of which can be ON or OFF for a particular image. Each basis image in the set V corresponds to the appearance of the scene when only a single light source (e.g., light1, light2, . . . , or light5) is ON. It should be understood that the images in Y can be acquired at arbitrary times, or in a sequence by a video camera. It should also be understood "lighting" includes other forms of "illumination" modalities that are additive, such as infrared (IR), ultraviolet (UV), and other frequencies in the electromagnetic spectrum.

Figure 2:
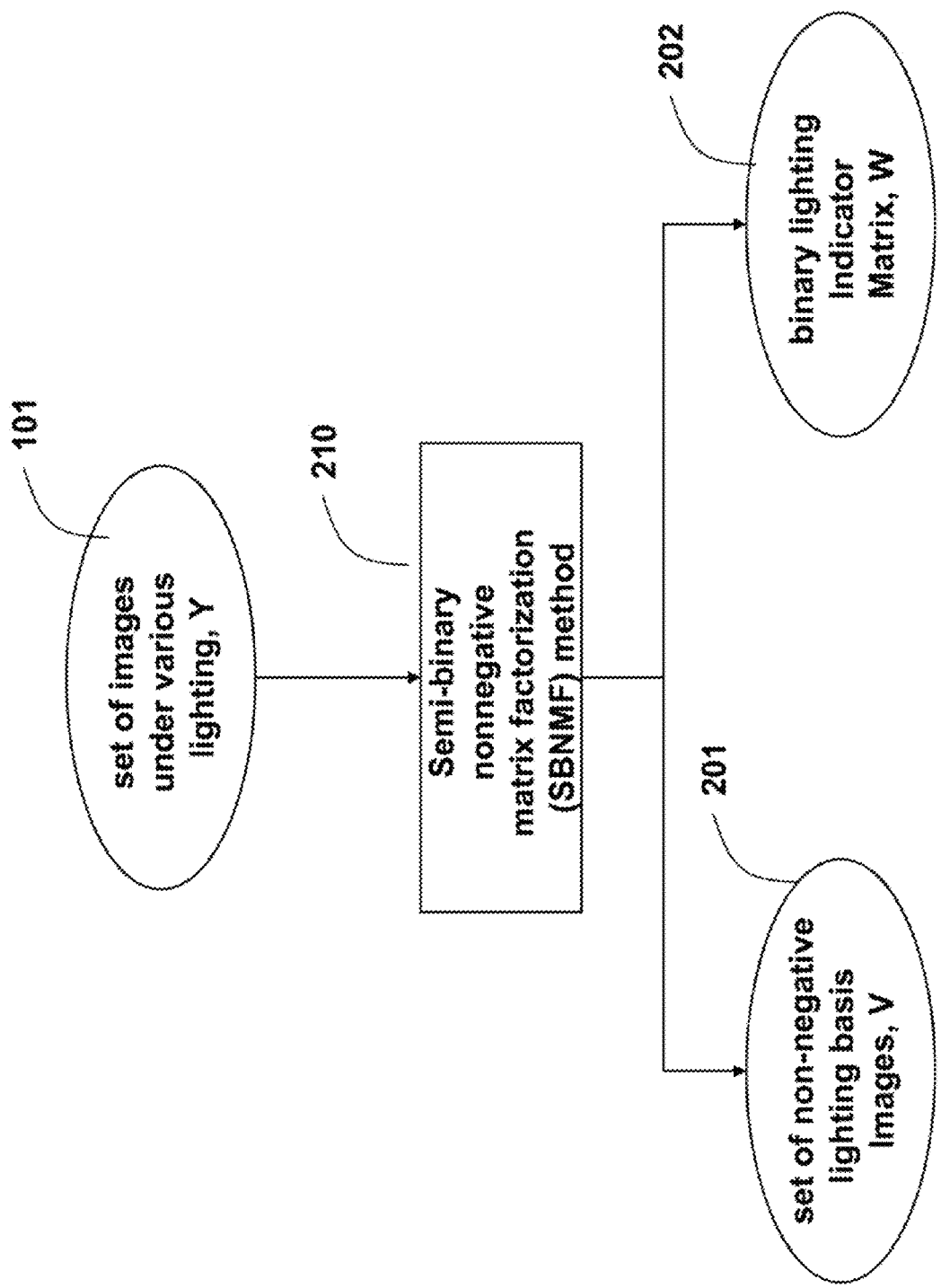
FIG. 2 is a block diagram of the method of FIG. 1 using semi-binary nonnegative matrix factorization.
Figure 3:
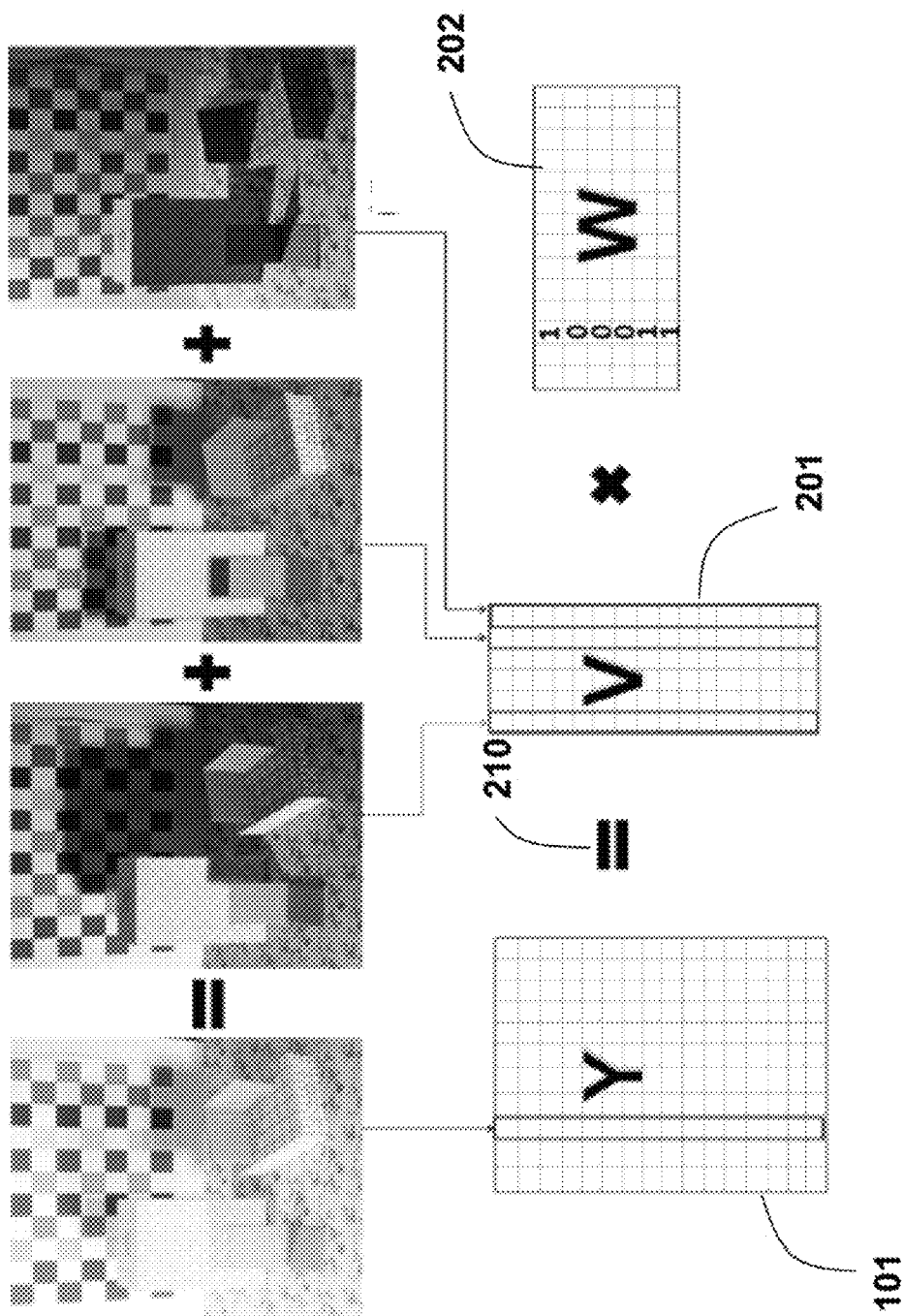
FIG. 3 a schematic of the method of FIG. 2.

As shown in FIG. 2, for some embodiments of the invention, the set of images 101 is factorized 210 into nonnegative lighting basis images V 201 and a binary lighting indictor matrix W 202 using semi-binary nonnegative matrix factorization (SBNMF). FIG. 3 shows the factorization schematically.

Generative Image Model

There are l light sources illuminating a scene, with each light source controlled by an independent ON/OFF switch. If there is a group of two or more lights that are either all ON or all OFF together (such that there is no input image in which one of the lights in the group is ON while another light in the group is OFF), then the group of lights is considered a single light source. For example, two lights that are controlled by the same switch are considered a single light source.

We assign a binary variable $w_i$ to indicate the status of each light source i. Then, we define a basis image $v_i \in \Re^{+^n}$ as the image formed when only the ith light is ON, where $\Re^+$ represents the nonnegative real numbers. Given an image y that is illuminated by any combination of the l light sources, the image can be expressed as a superposition of individual basis images:

$$y = \sum_{i=1}^{l} w_i v_i, \; w_i \in \{0, 1\}. \quad (1)$$

Herein, we express every image as a column vector formed by stacking the values of all pixels in the image into a single column.

We acquire the set Y of m images lit by various binary combinations of the l light sources, and arrange the image data into a matrix $$Y = [y_1, y_2, \ldots, y_m] \in \Re^{+^{n \times m}}.$$

Following equation (1), this data matrix can be factorized as:

$$Y = VW, \quad (2)$$

where the columns of $V \in \Re^{+^{n \times l}}$ correspond to the l basis images $v_i$, and $W \in \{0,1\}^{l \times m}$ is a binary indicator matrix in which each entry $W_{ij}$ is an indicator coefficient that represents the contribution of the i th light source to the j th input image, as shown in FIGS. 2-3. That is to say, every input image is a binary combination of the m lighting basis images.

Note that if there is ambient lighting in the scene (light that is present in every image), in our model this can be modeled by an additional basis image (an additional column in the matrix V) and a corresponding additional row of the indicator matrix W whose elements are all 1.

In some embodiments, if a single light source is moved to a different position between the times at which two input images are acquired, we consider that light source to be two separate light sources. For example, if two input images acquired several hours apart are both illuminated by the sun, we consider the sun in the first image to be a first light source and the sun in the second image to be a second light source.

Recovering Basis Images Via SBNMF

In some embodiments, we recover the lighting basis images and indicator matrix from the set of input images using SBNMF. If the true lighting basis images are linearly independent, and we observe sufficient illumination variability, i.e., the rank of the true indicator matrix W is not less than the number of lights, then the number of lights l in the scene is given by the rank of the data matrix Y.

We formulate recovery of the basis images and indicator matrix as a constrained optimization problem:

$$\min_{V,W} \|Y - VW\|_F^2, \text{ such that } V_{ij} \geq 0, \; W_{jk} \in \{0, 1\}, \; \forall \, i, j, k \quad (3)$$

which we call the SBNMF. This is a challenging problem due to the non-convex objective function and the binary constraints on W. Therefore, we initially solve a continuous relaxation:

$$\min_{V,W} \|Y - VW\|_F^2, \text{ such that } V_{ij} \geq 0, 0 \leq W_{jk} \leq 1, \forall\, i, j, k \quad (4)$$

where the binary constraints on $W_{ij}$ are replaced by simple box constraints of lower and upper bounds. This is a bi-convex problem which we solve using alternating direction method of multipliers (ADMM). ADMM is a variant of the conventional augmented Lagrangian method, see below.

We rewrite equation (4) using an auxiliary variable X, and replacing positivity and box constraints by indicator functions:

$$\min_{X,V,W} \|Y - X\|_F^2 + I_{[0,\infty]}(V) + I_{[0,1]}(W) \text{ such that } X - VW = 0 \quad (5)$$

where an indicator function $I_S(x)$ takes value 0 if $x \in S$ and equals $\infty$ everywhere else.

Next, we form the augmented Lagrangian:

$$L(X,V,W,U) = \|Y-X\|_F^2 + I_{[0,\infty]}(V) + I_{[0,1]}(W) + (\mu/2)\|X - VW + U\|_F^2 - (\mu/2)\|U\|_F^2 \quad (6)$$

where U is the scaled dual variable and $\mu$ is the augmented Lagrangian parameter. We use the scaled form of the augmented Lagrangian function in which the scaled Lagrangian multiplier is redefined as $U=Z/\mu$, where Z is the original Lagrange multiplier.

ADMM solves the augmented Lagrangian dual function by a set of convex subproblems where the biconvex function is decoupled:

$$(X^{k+1}, V^{k+1}) = \operatorname*{argmin}_{X, V \geq 0} \|X - Y\|_F^2 + (\mu/2)\|X - VW^k + U^k\|_F^2, \quad (7)$$

$$W^{k+1} = \operatorname*{argmin}_{0 \leq W \leq 1} \|X^{k+1} - V^{k+1}W + U\|_k^2 \quad (8)$$

$$U^{k+1} = U^k + X^{k+1} - V^{k+1}W^{k+1} \quad (9)$$

These subproblems are iteratively solved until convergence of primal and dual residuals.

Following that, we round each entry of the matrix W to {0, 1}, and determine the basis images V based on the binary indicator matrix using nonnegative least squares:

$$\min_{V} \|Y - VW\|_F^2 \text{ such that } V_{ij} \geq 0, \forall\, i, j. \quad (10)$$

Note that because W is constant in the optimization (10), the problem is convex.

FIG. 4 shows the pseudocode for our factorizing procedure. The variables and equations referenced in the pseudocode in this and other procedures shown as pseudocode are all detailed herein.

Note that in other embodiments, the individual light sources are not restricted to being only ON or OFF, but the light sources' intensities can change continuously, (e.g., a dimmer switch is used). In this case, the indicator coefficients in the indicator matrix W are not restricted to binary values {0, 1} but can be any nonnegative real numbers. In this case, every input image is a nonnegative linear combination of the m lighting basis images. In such cases, the factorization can be performed using conventional nonnegative matrix factorization.

Detecting 3D Geometric Boundaries

In some embodiments, we detect 3D geometric boundaries in the set of images acquired of the scene. As observed in images of the scene, 3D geometric boundaries are contours that separate two surfaces in the scene where there is a 3D depth discontinuity, or where there is significant change in surface normals. For typical indoor scenes, a distant lighting assumption is not valid. To allow for nearby lighting, we consider one small image patch at a time, and analyze how the local appearance of that patch varies with multiple lighting conditions. The method can use patches with a variety of shapes and sizes. For example, we can consider a square or circular patch with a fixed diameter (e.g., 7 pixels) centered at each image pixel.

If all pixels in a patch come from a single smooth surface in the scene, then the patch appearance across varying lighting forms a one-dimensional subspace. If the patch contains a 3D geometric boundary, then the appearance subspace of the patch generally has dimension greater than one.

Illumination Subspace of Local Appearance

For simplicity, we justify our method for Lambertian surfaces with only a direct lighting component, but an analogous argument applies to a broader class of reflectance functions and indirect lighting, e.g., multiple reflections. To simplify the explanation, we describe only point light sources, because an extended isotropic light source can be arbitrarily well approximated as a superposition of multiple point light sources.

Figures 5A, 5B, 5C:
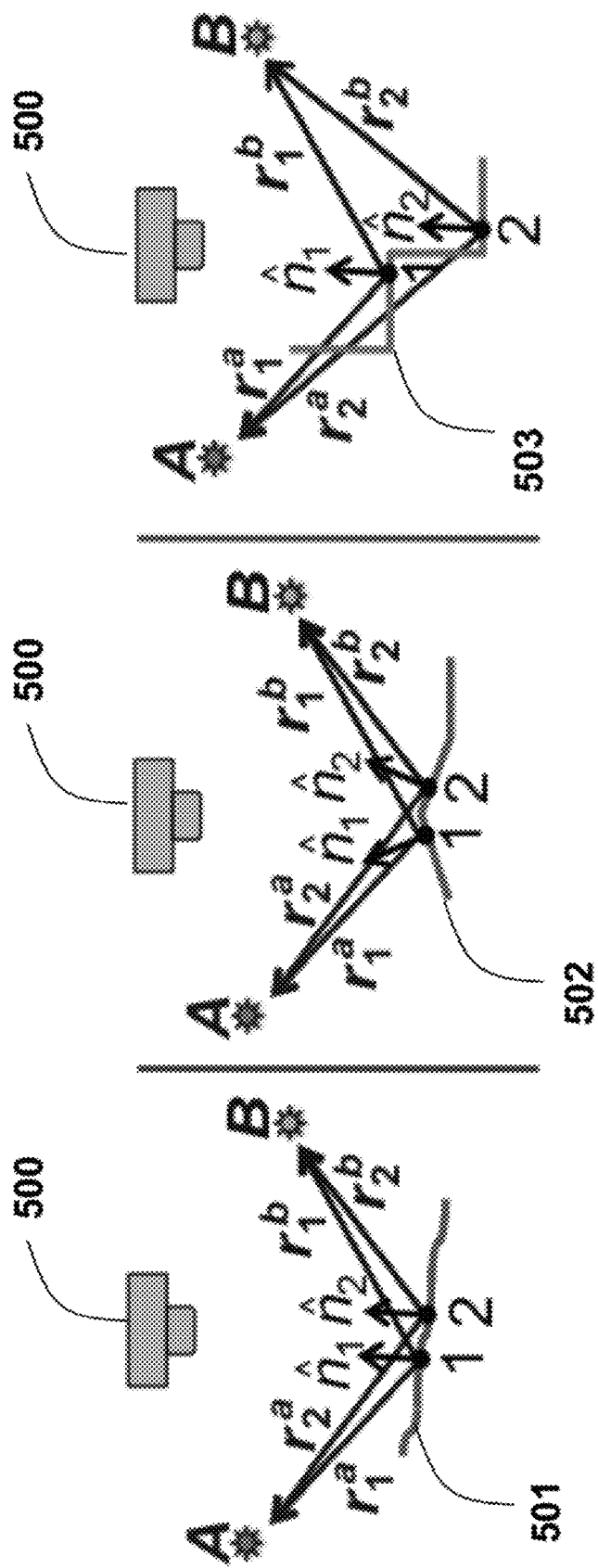
FIGS. 5A, 5B, and 5C are schematics of Lambertian surfaces used by some embodiments of the invention.

FIGS. 5A, 5B, and 5C schematically show three Lambertian surfaces 501-503 as would be observed by a camera 500, each illuminated by two point light sources A and B. For all three surfaces, the pixels corresponding to points 1 and 2 in images acquired by the camera will be near each other. In FIG. 5A, there are no 3D geometric boundaries in the surface 501. In FIG. 5B, there is a discontinuity in the surface normals of the surface 502. In FIG. 5C, there is a discontinuity in depth in the surface 503 from the camera's point of view.

We describe our notation for light source A, and that for source B is analogous. The surface normal at point i is $\hat{n}_i$, and the vector from point i to light A is $r_i^a$ (the corresponding unit vector is $\hat{r}_i^a$). The intensity of the point on the image plane that corresponds to surface point i is $I_i^a$ (for light source A) or $I_i^b$ (for light B):

$$I_i^a = \gamma_i^a \frac{\hat{n}_i^T \hat{r}_i^a}{\|r_i^a\|^2} E^a \rho_i, \; I_i^b = \gamma_i^b \frac{\hat{n}_i^T \hat{r}_i^b}{\|r_i^b\|^2} E^b \rho_i. \quad (11)$$

Here $\hat{n}_i^T \hat{r}_i^a$ is the cosine of the angle between $\hat{n}_i$ and $\hat{r}_i^a$, $E^a$ is the radiance intensity of light source A, and $\rho^i$ is the surface albedo at point i. The binary value $\gamma_i^a = 1$ if point i is illuminated by source A, whereas $\gamma_i^a = 0$ if point i is not illuminated by source A due to an attached or cast shadow.

For each of the three surfaces, points 1 and 2 are near each other from the perspective of the camera, so the points will both be included in the same small image patch. In FIG. 5A, the patch contains no sudden changes in normal and no depth discontinuities. Thus, the 3D distance between points 1 and 2 is small compared to the distances from each point to each light, and hence, we have the following approximate equalities:

$$\hat{n}_1 \approx \hat{n}_2, r_1^a \approx r_2^a, r_1^b \approx r_2^b. \quad (12)$$

Because all points in the patch share approximately the same normal and the same vector to each light source, we can eliminate the subscripts i in equation (11) and use $\hat{n}$, $r^a$, and $r^b$ for all points in the patch. For now, we assume that every point i in the patch shares a single value for $\gamma_i^a$ (which we call $\gamma^a$) and shares a single value $\gamma^b$ of $\gamma_i^b$, which means that for each light source, the entire patch is either illuminated by or shadowed from that light, i.e., the patch contains no shadow edges. We consider shadow edges below.

Let $P^a$ and $P^b$ represent the vector of pixel intensities of the patch imaged under light A alone and light B alone respectively. For the case in FIG. 5A, we have the approximate equality $P^a = k^a \rho$:

$$\begin{bmatrix} I_1^a \\ I_2^a \\ \vdots \\ \phantom{I} \end{bmatrix}_{P^a} \approx \underbrace{\frac{\gamma^a E^a \hat{n}^T \hat{r}^a}{\|r^a\|^2}}_{k^a} \begin{bmatrix} \rho_1 \\ \rho_2 \\ \vdots \\ \phantom{\rho} \end{bmatrix}_{P^a}, \quad (13)$$

where the scalar $k^a$ is constant for all pixels in the patch, and $\rho$ is the vector of surface albedos for all of the pixels in the patch. For the same patch under light source B, we have the analogous equation: $P^b = k^b \rho$.

Thus, if a patch contains no sudden changes in normal nor in depth (and no shadow edges), then the pixel intensities under any light source are equal to a scalar multiple of $\rho$. In other words, the subspace of spanned by the appearance of that local patch under all light sources (which we call the illumination subspace of local appearance) is one-dimensional (1D). Note that this is true regardless of the surface texture (albedo). Even if the surface albedo of the patch contains high-contrast texture edges, its illumination subspace of local appearance is still 1D.

This realization is at the heart of our method for finding geometric edges, because the same is not generally true if a patch contains a 3D geometric edge.

For example, if a patch contains an abrupt change in normal, as in FIG. 5B, then the first approximation in equation (12) does not hold, and the intensity of each point in the patch depends on the cosine of the angle between its surface normal and its direction to the light source. If a patch contains a different type of 3D geometric boundary, a depth discontinuity as in FIG. 5C then the last two approximations in (12) do not hold (because the lights are not at infinity), and the intensity of each point in the patch depends on the cosine of the angle between its surface normal and its direction to the light source. In general, if a patch contains a 3D geometric edge, then its illumination subspace of local appearance has a dimension greater than 1.

Confidence Map of 3D Geometric Boundaries

In some embodiments, we detect geometric boundaries by identifying patches whose illumination subspaces of local appearance have dimension greater than one. For each pixel location, we extract a $\tau$-pixel patch centered at that location from all m input images (m light combinations), and arrange the patches as column vectors in a $\tau \times m$ matrix, Z:

$$Z = [P^{(1)}, P^{(2)}, \ldots, P^{(m)}], \quad (14)$$

where vector $P^{(i)}$ contains all $\tau$ pixel (color or intensity) values of the patch extracted from image i at that pixel location. To determine the rank of the illumination subspace of local appearance for that patch location, we apply singular value decomposition (SVD) to Z and obtain the singular values $\{\sigma_i^P\}$ (ordered largest to smallest). In the absence of noise, a one-dimensional illumination subspace yields just one non-zero singular value $\sigma_1^P$, with $\sigma_2^P = 0$. Due to noise in the images $\sigma_2^P$ is not exactly 0, but approximately 0. To determine whether the illumination subspace of local appearance has rank 1 we use a confidence value that is accurate in the presense of noise.

In some embodiments, for each pixel location, we determine a confidence value that the corresponding patch contains a 3D geometric boundary as a ratio of the second to the first singular value for the patch centered at that location:

$$c(P) = \sigma_2^P / \sigma_1^P. \quad (15)$$

Using equation (15), we obtain a confidence map, an image in which the intensity of each pixel is the confidence value that was determined for that pixel location.

In other embodiments, the confidence value that the illumination subspace of local appearance has rank greater than 1 can be computed in other ways than equation (15). For example, we could define c(P) some other function of the singular values, such as $c(P) = \sigma_2^P / k$, where k is a normalization factor determined from the singular values of the illumination subspaces of all of the patches. The pseudocode for our 3D geometric boundary detection procedure in shown in FIG. 6.

In one embodiment, rather than extracting patches from the m original input images, we extract patches from the l non-negative lighting basis images described above. This can be a more stable approach if the set of input images is unbalanced, for example, if a large number of input images come from a single lighting condition, and only a few input images come from the other lighting conditions.

Removing Shadow Edges

Our method successfully detects both types of 3D geometric boundaries: discontinuity in the normal, and discontinuity in depth, herein both types are characterized as "boundaries." In addition, our method is not confused by texture edges. However, shadow edges can be detected by the method outlined in FIG. 6 as false positive 3D geometric boundaries. A patch captains a shadow edge if for one of the light sources, some pixels of the patch are illuminated and others are in shadow.

In most cases, each shadow edge is caused by only a single light source. Based on this observation, we can use our ability to factorize a set of images of a scene into single-light-source lighting basis images to eliminate most of the false positives caused by shadow edges.

We can eliminate the shadows produced by light source i by subtracting basis image $v_i$ from the set of images Y:

$$Y^{(i)} = Y - v_i w^i, \quad (16)$$

where $w^i$ is the i th row of lighting indicator matrix W, and $Y^{(i)}$ denotes the scene images re-rendered with light i turned off.

Applying our boundary detection technique on $Y^{(i)}$ results in a boundary confidence map $C^{(i)}$ in which the shadow edges resulting from the i th light source are eliminated. The final confidence map is aggregated by taking the minimum at each pixel location among all confidence maps of $\{C^{(i)}\}_{i=1}^{l}$, so that if a shadow edge disappears when any one of the light sources is removed, that edge will not be present in the final confidence map.

The pseudocode for our boundary detection procedure with shadow edges removed is shown in FIG. 7.

In one embodiment, rather than setting $Y^{(i)}$ equal to a re-rendered version of the original images using equation (16), instead for each i we set $Y^{(i)}$ equal to the set of all of the lighting basis images other than lighting basis image i. In this embodiment, for each i, the reduced set of lighting basis images $Y^{(i)}$ contains l−1 lighting basis images. This can be a more stable approach if the set of input images is unbalanced, for example, if a large number of input images come from a single lighting condition, and only a few input images come from the other lighting conditions.

Scene Editing

Figure 8:
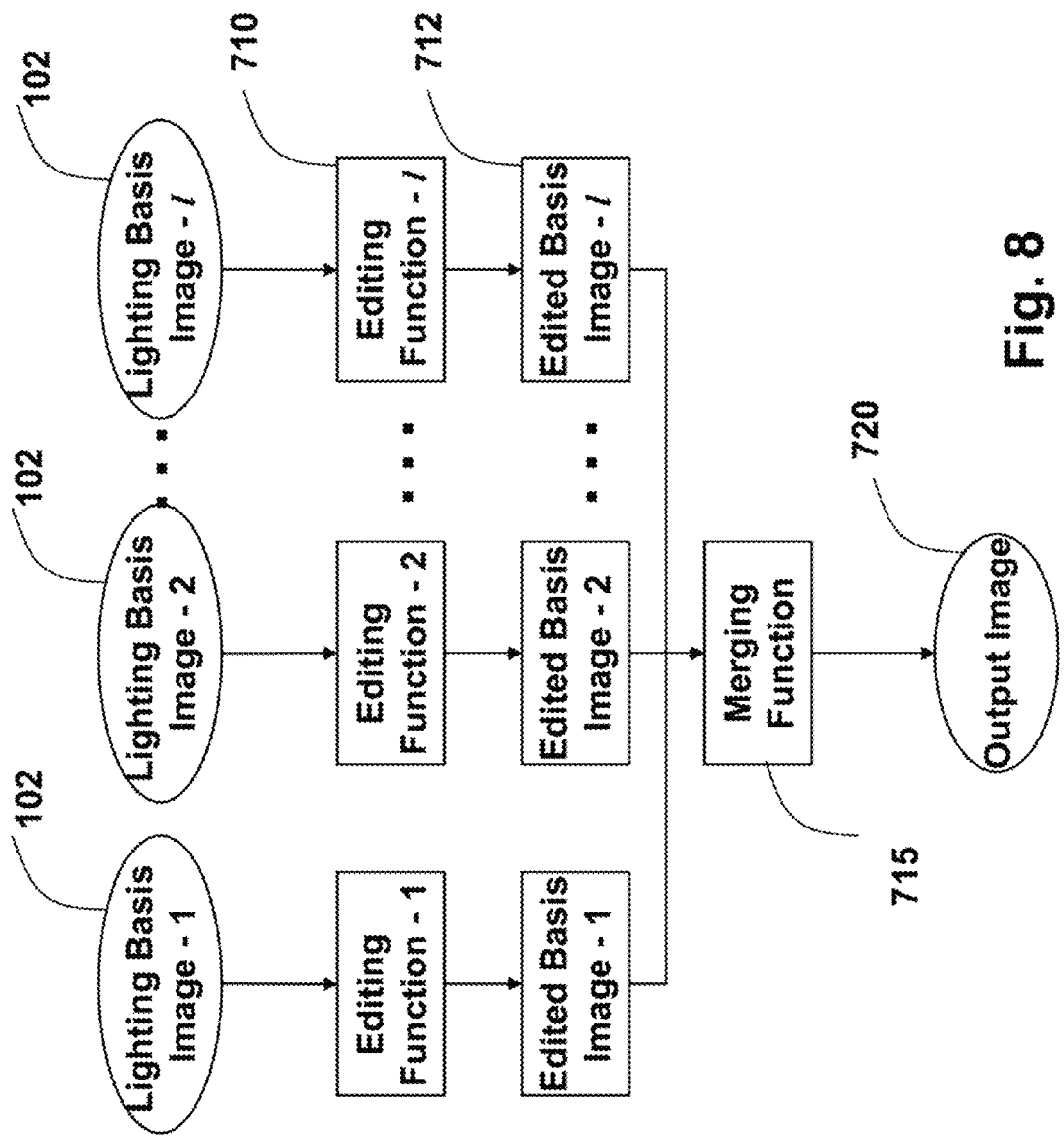
FIG. 8 is a block diagram of a scene editing application according to one embodiment of the invention.

As shown in FIG. 8, one application that can use the embodiments of the invention is scene editing. The lighting basis images 102 enable scene editing by directly modifying individual lighting basis images, rather than the acquired (input) images.

The individual lighting basis images can be edited to produce edited basis images 712 by applying an editing function 710 which can be a linear function, such as scaling, or a nonlinear function such as histogram equalization, gamma correction, tone mapping, or brightness and contrast adjustment. In addition it is possible to edit a region of the lighting basis images, such as inserting an object or modifying the texture. An output image 720 is constructed by applying a merging function 715, such as a linear combination, to the edited basis images. The editing function can be applied to all or a part of the lighting basis images.

In another application, the shadow and highlight regions in a lighting basis image can be detected by finding almost black regions and saturated regions, respectively, in the lighting basis image. Intensity (color) values of such regions can be copied from identical locations in a different lighting basis image in which the values are not black or saturated. The values are then modified so that the image values are continuous across the original shadow and highlight boundaries. This approach can eliminate dark shadow and highlight regions in the scene without saturating or darkening the entire image.

Detected shadow regions can be used to replace the texture of a surface with a different texture while conforming to the illumination information. The brightness of the part of the new texture that is under shadow is darkened to match the shadow information.

The steps in the methods described and shown herein can be performed in a processor connected to a memory and input/output interfaces as known in the art. It is understood that typical digital images include millions and millions of pixels, and that it is impossible to process intensities or color values of this enormous magnitude mentally.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for detecting a three-dimensional (3D) geometric boundary from a set of two or more input images acquired by a single stationary non-stereoscopic imaging camera of a scene illuminated by a set of two or more light sources, wherein in each input image the scene is illuminated by a combination of the light sources, and wherein at least two images in the set of input images are illuminated by different combinations of the light sources, wherein the illumination conditions are unknown in one or more of the following ways, unknown light positions, unknown light intensities, unknown light combinations, comprising steps of:

obtaining, for each pixel location, a set of patches, wherein each patch in the set is extracted from an identical region of a different input image from the set, wherein the region contains the pixel location, and wherein pixels at the location in all of the input images correspond to the same point in the scene; and determining, for each pixel location, a confidence value that the location is on the 3D geometric boundary, wherein the determining for each location further comprises:

arranging pixel intensity or color values of the set of patches in a τ×m matrix, where τ is a number of the pixels in each patch and m is a number of the input images, so that each column of the matrix represents one patch;

applying a singular value decomposition (SVD) to the matrix to obtain singular values; and determining the confidence value for the pixel location as a function of the singular values, wherein the steps are performed in a processor.

2. The method of claim 1, wherein the confidence value for each pixel location is a ratio of a second largest singular value to a largest singular value.

3. The method of claim 1, wherein the confidence value for each pixel location is a magnitude of a second largest singular value divided by a normalization factor.

4. The method of claim 1, further comprising:

forming a confidence map from the confidence values for the pixel locations, to indicate a likelihood of each pixel location lying on the 3D geometric boundary.

5. The method of claim 1, wherein each light source is stationary.

6. The method of claim 1, wherein two or more light sources in the set of light sources correspond to a single light source that is moved to different positions.

7. The method of claim 1, wherein for each pixel location, the region is centered at the pixel location.

8. The method of claim 1, wherein the set of images is acquired using time-lapse photography.

9. The method of claim 1, wherein the set of images includes images from a video acquired by a video camera.

10. The method of claim 1, wherein the set of input images is a set of lighting basis images, wherein each lighting basis image is a nonnegative image that corresponds to an appearance of the scene illuminated by only one of the light sources.

11. The method of claim 1, wherein the scene is in an indoor environment.

12. The method of claim 1, wherein the scene is in an outdoor environment.

13. A method for detecting a three-dimensional (3D) geometric boundary from a set of two or more input images of a scene illuminated by a set of two or more light sources, wherein the set of input images is acquired by a single stationary non-stereoscopic imaging camera, wherein in each input image the scene is illuminated by a combination of the light sources, and wherein at least two images in the set of input images are illuminated by different combinations of the light sources, wherein the illumination conditions are unknown in one or more of the following ways, unknown light positions, unknown light intensities, unknown light combinations, comprising the steps of:

decomposing the set of input images into a set of lighting basis images and a set of indicator coefficients, wherein each lighting basis image is a nonnegative image that corresponds to an appearance of the scene illuminated by only one of the light sources, and wherein each indicator coefficient indicates a contribution of one of the light sources to one of the input images;

obtaining, for each lighting basis image i, a set of images $Y^{(i)}$ in which the contribution of lighting basis image i has been removed;

determining, for each set of images $Y^{(i)}$ and for each location, a set of patches wherein each patch in the set is extracted from an identical region of a different image in $Y^{(i)}$, wherein the region contains the location, and wherein pixels at the location in all of the input images correspond to the same point in the scene;

determining, for each set of images $Y^{(i)}$ and for each location, a confidence value that the location is on the 3D geometric boundary;

forming, for each set of images $Y^{(i)}$, a confidence map $C^{(i)}$ from the confidence values determined from the locations; and determining, for each location, a final confidence value, by determining a minimal value over all confidence maps $C^{(i)}$ of the value at that location, wherein the minimal value is the final confidence value indicating a likelihood of the location being on the 3D geometric boundary, wherein the steps are performed in a processor.

14. The method of claim 13, further comprising:

forming a final confidence map from the final confidence values of the locations, to indicate a likelihood of each location being on the 3D geometric boundary.

15. The method of claim 13, wherein the obtaining further comprises:

subtracting, for each lighting basis image i, the contribution of the lighting basis image from all of the input images in the set of input images Y, to obtain the set of images $Y^{(i)}$.

16. The method of claim 13, wherein the obtaining further comprises:

removing, for each lighting basis image i, the lighting basis image from the set of lighting basis images, to obtain the set of images $Y^{(i)}$.

* * * * *